United States Patent
Williams et al.

(10) Patent No.: US 10,623,935 B2
(45) Date of Patent: Apr. 14, 2020

(54) WIRELESS SYSTEM FOR IMPROVED STORAGE MANAGEMENT

(71) Applicants: Phillip Lucas Williams, Glendale, CA (US); Scott Sullivan, San Francisco, CA (US)

(72) Inventors: Phillip Lucas Williams, Glendale, CA (US); Scott Sullivan, San Francisco, CA (US)

( * ) Notice: Subject to any disclaimer, the term of this patent is extended or adjusted under 35 U.S.C. 154(b) by 226 days.

(21) Appl. No.: 15/955,368

(22) Filed: Apr. 17, 2018

(65) Prior Publication Data

US 2018/0317072 A1    Nov. 1, 2018

Related U.S. Application Data

(60) Provisional application No. 62/490,942, filed on Apr. 27, 2017.

(51) Int. Cl.

| | |
|---|---|
| *H04W 4/80* | (2018.01) |
| *H04W 48/10* | (2009.01) |
| *H04W 4/35* | (2018.01) |
| *H04L 29/08* | (2006.01) |
| *H04W 4/029* | (2018.01) |
| *H04W 4/33* | (2018.01) |
| *H04W 4/02* | (2018.01) |
| *H04B 1/3827* | (2015.01) |

(52) U.S. Cl.
CPC ............. *H04W 4/80* (2018.02); *H04L 67/18* (2013.01); *H04W 4/027* (2013.01); *H04W 4/029* (2018.02); *H04W 4/33* (2018.02); *H04W 4/35* (2018.02); *H04W 48/10* (2013.01); *H04B 1/3827* (2013.01)

(58) Field of Classification Search
None
See application file for complete search history.

(56) References Cited

U.S. PATENT DOCUMENTS

| | | | |
|---|---|---|---|
| 2005/0192808 A1* | 9/2005 | Sugiyama | G06F 16/58 704/270 |
| 2016/0309075 A1* | 10/2016 | Alexia | H04N 5/2256 |
| 2018/0060993 A1* | 3/2018 | Cheluvaraju | G02B 21/36 |
| 2018/0109681 A1* | 4/2018 | McLean, Jr. | H04M 1/6505 |
| 2018/0352976 A1* | 12/2018 | Shen | H04W 12/06 |
| 2019/0253748 A1* | 8/2019 | Forte | H04N 21/854 |

\* cited by examiner

*Primary Examiner* — Carlos Garcia
(74) *Attorney, Agent, or Firm* — Scott Sullivan

(57) ABSTRACT

The present storage management system, described in detail in the following specification and accompanying drawings, includes an active (self-powered) Bluetooth® BLE transceiver beacon (hereinafter referred to as "beacon"), which, according to a preferred embodiment has a thin flat form factor with a self-adhesive-backing. A beacon is secured to each storage box and continuously transmits an "advertisement packet" to the surrounding area. A user's smart device (e.g., a smart phone) picks up the different signals sent by each beacon and is able to communicate with select ones. A software application allows a user to catalog items to be stored so that each is effectively "linked" to a particular storage box. At a later time, any of the catalogued items may be selected and the corresponding storage container in which the item resides is instructed to notify its location within the storage area using light and sound. According to a second embodiment of the invention, a user may tap any box within the storage area to have the contents of that box be displayed on the user's smart device.

20 Claims, 8 Drawing Sheets

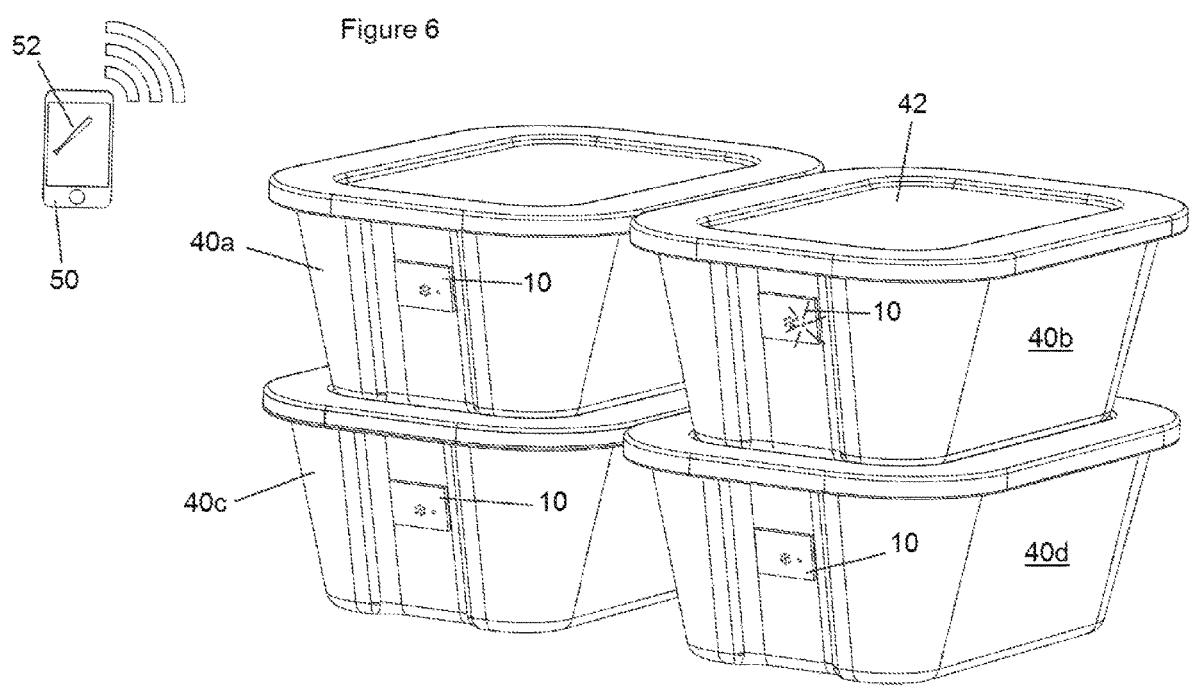

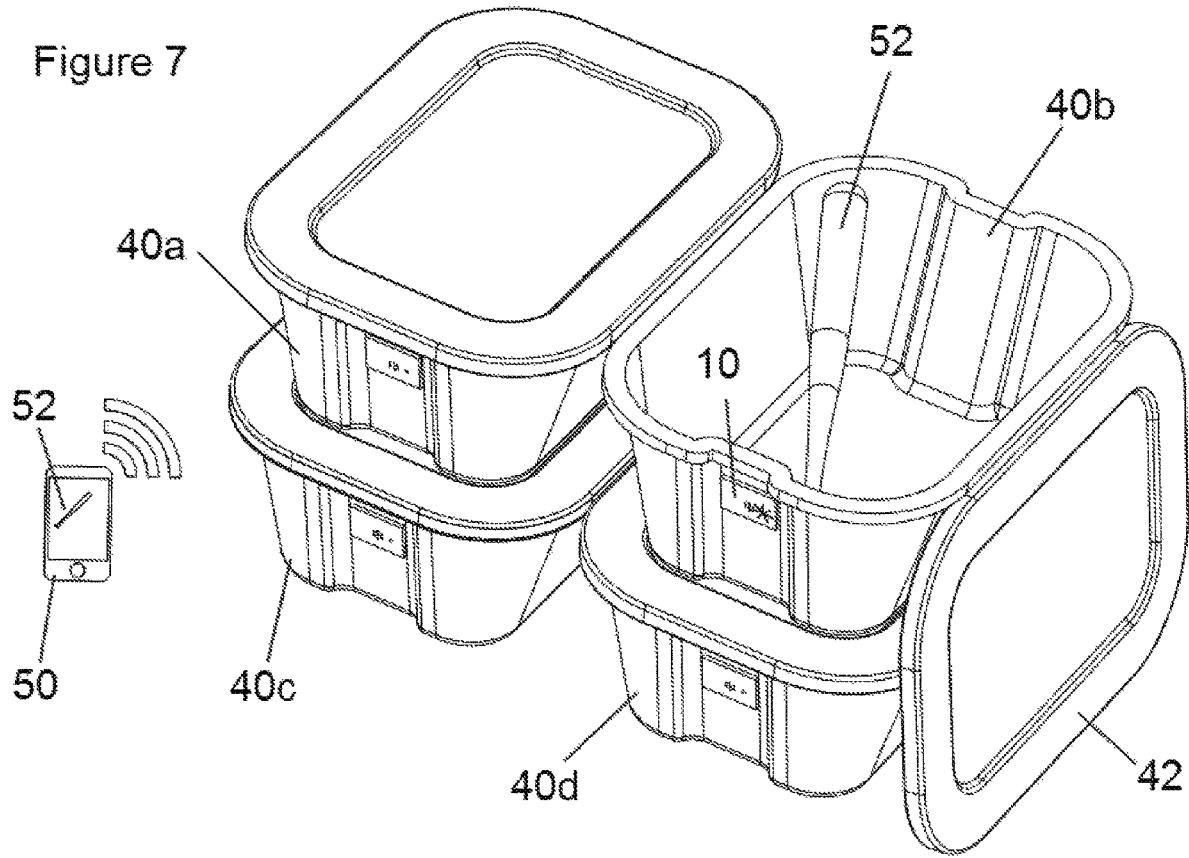

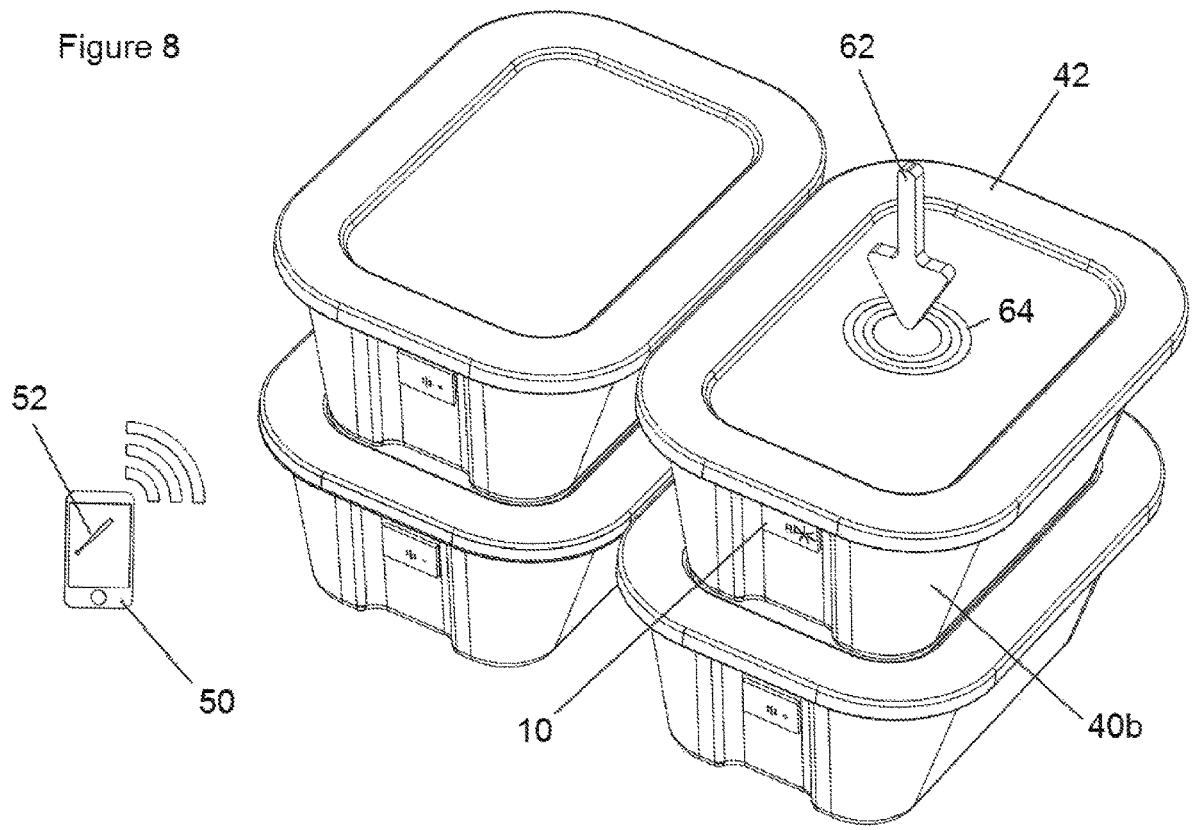

WIRELESS SYSTEM FOR IMPROVED STORAGE MANAGEMENT

CLAIM OF PRIORITY

This application claims priority from U.S. Provisional Patent Application No. 62/490,942, filed Apr. 27, 2017, entitled: "Wireless System for Improved Storage Management," the contents of which are incorporated herein in their entirety.

BACKGROUND OF THE INVENTION a) Field of the Invention

The present invention relates to residential storage management, and more particularly, to storage management systems which employ wireless electronic technologies.

b) Description of the Related Art

A common human trait is to accumulate items and whatever is not used or discarded in due course, is eventually stored somewhere. Apart from not having enough room for storage, a typical problem many people have with storage is not being able to find (or quickly find) a particular item at any given time.

Boxes are usually used to store items in an attic, basement, closet or garage. The boxes are usually either cardboard, such as the classic "banker's box" or plastic, such as the many plastic storage bins available from Tupperware® and Rubbermaid®.

People have a habit of cleaning up their house every so often (e.g., "spring cleaning") and anything that is to be kept, but not used is typically thrown into any open box they can find. The boxes are then usually randomly stored, filling the nearest open space available in an attic, basement, closet or garage . . . and there the boxes will sit, until a stored item is needed.

For the typical homeowner, when a particular stored item is needed, a user will undergo an arduous, extensive and often fruitless search, opening essentially every box in every storage area until they either find the item, or give up trying. The places that the boxes are stored are usually poorly lit, forcing the user to struggle with portable lighting, as they search for the wanted item. Sometimes, it is later discovered that the item they are looking for was never even stored, but instead was thrown away years before. Needless to say, keeping track of stored items is a tedious, inefficient, time-consuming, often frustrating task and advances in storage management and retrieval are needed.

It is a first object of the invention to provide a system of storage management which overcomes the deficiencies of the prior art.

SUMMARY OF THE INVENTION

The present storage management system, described in detail in the following specification and accompanying drawings, includes an active (self-powered) Bluetooth® BLE transceiver beacon (hereinafter referred to as "beacon"), which, according to a preferred embodiment has a thin flat form factor with a self-adhesive-backing. A beacon is secured to each storage box and continuously transmits an "advertisement packet" to the surrounding area. A user's smart device (e.g., a smart phone) picks up the different signals sent by each beacon and is able to communicate with select ones. A software application allows a user to catalog items to be stored so that each is effectively "linked" to a particular storage box. At a later time, any of the catalogued items may be selected and the corresponding storage container in which the item resides is instructed to notify its location within the storage area using light and sound.

According to a second embodiment of the invention, a user may tap any box within the storage area to have the contents of that box be displayed on the user's smart device.

The features of this invention, and the manner of attaining them, will become more apparent and the invention itself will be better understood by reference to the following description of the disclosed embodiments taken in conjunction with the accompanying drawings.

BRIEF DESCRIPTION OF THE DRAWINGS

FIG. 6 is a perspective view of the four storage containers of FIG. 5, and showing the smart device broadcasting the search request to the beacons on the containers, with one beacon activated by illuminating its LED, according to the present invention;

FIG. 7 is a perspective view of the four storage containers of FIG. 6, showing the smart device broadcasting the search request to the beacons on the containers, with one beacon of one container activated by illuminating its LED, and showing the one container uncovered revealing the item of interest, according to the present invention; and FIG. 8 is a perspective view of the four storage containers of FIG. 4, according to a second embodiment of the invention, showing one container being tapped or hit, resulting in the beacon of that container transmitting an "impact" signal to a nearby smart device, which in turn, displays the items that are in that container.

DETAILED DESCRIPTION OF THE PREFERRED EMBODIMENTS

By way of overview, the present invention is a system to help manage items being stored within a household. Of course, the present management system, described in detail in the following specification and accompanying drawings, may be used in a variety of locations and applications, but the preferred use and expected maximum benefit is within a residential home used to store household items, such as toys, books, tools, camping equipment, clothes, documents, heirlooms, etc. As described in detail in the following specification and accompanying drawings, the present storage management system employs active (self-powered) Bluetooth® BLE transceiver beacons (hereinafter referred to as "beacons"). A beacon is attached to each storage box and includes illumination and a sound generator. A software application running on a user's smart device allows the user to catalog items to be stored so that each item becomes effectively "linked" to a particular beacon and storage box. At a later time, any of the catalogued items may be selected on the phone display and the beacon which is attached to the "linked" storage box in which the selected item resides, is then instructed to notify the user of its location within the storage area using light and sound.

Figure 1:
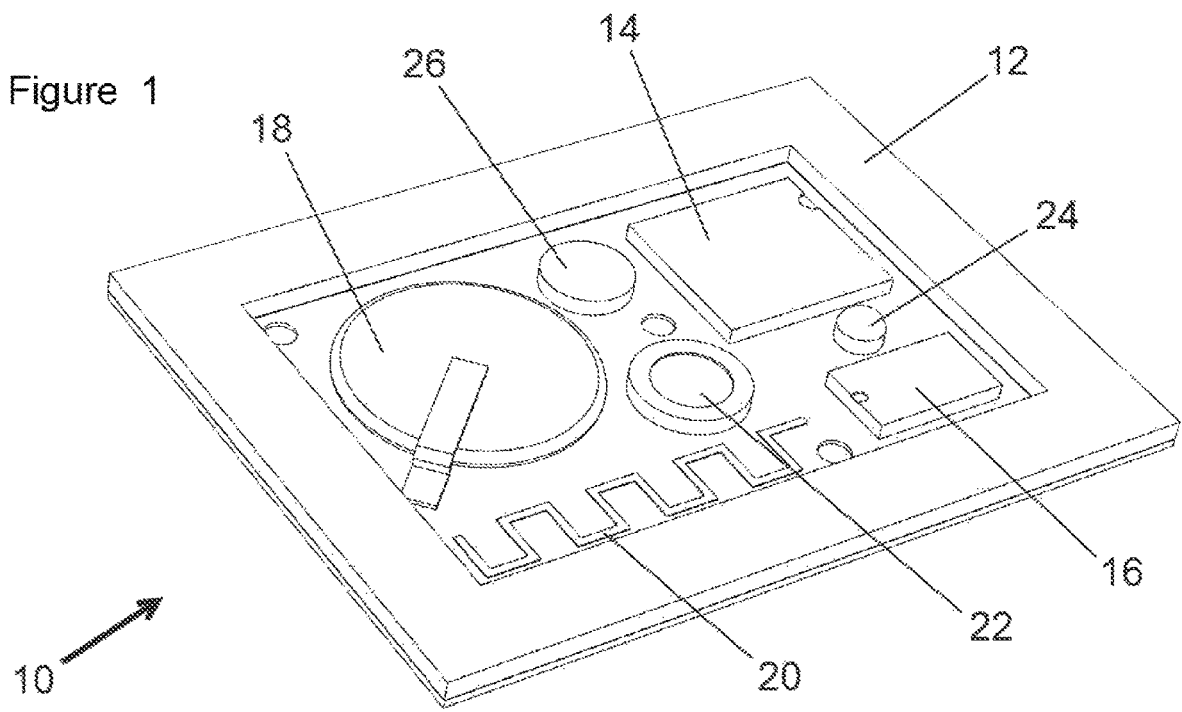
FIG. 1 is a perspective view of an uncovered exemplary active (self-powered) Bluetooth® BLE transceiver beacon, showing a housing, a battery, a microprocessor, a bluetooth transceiver, an LED, a sound generator, an antenna, and an accelerometer, according to the present invention.
Figure 2:
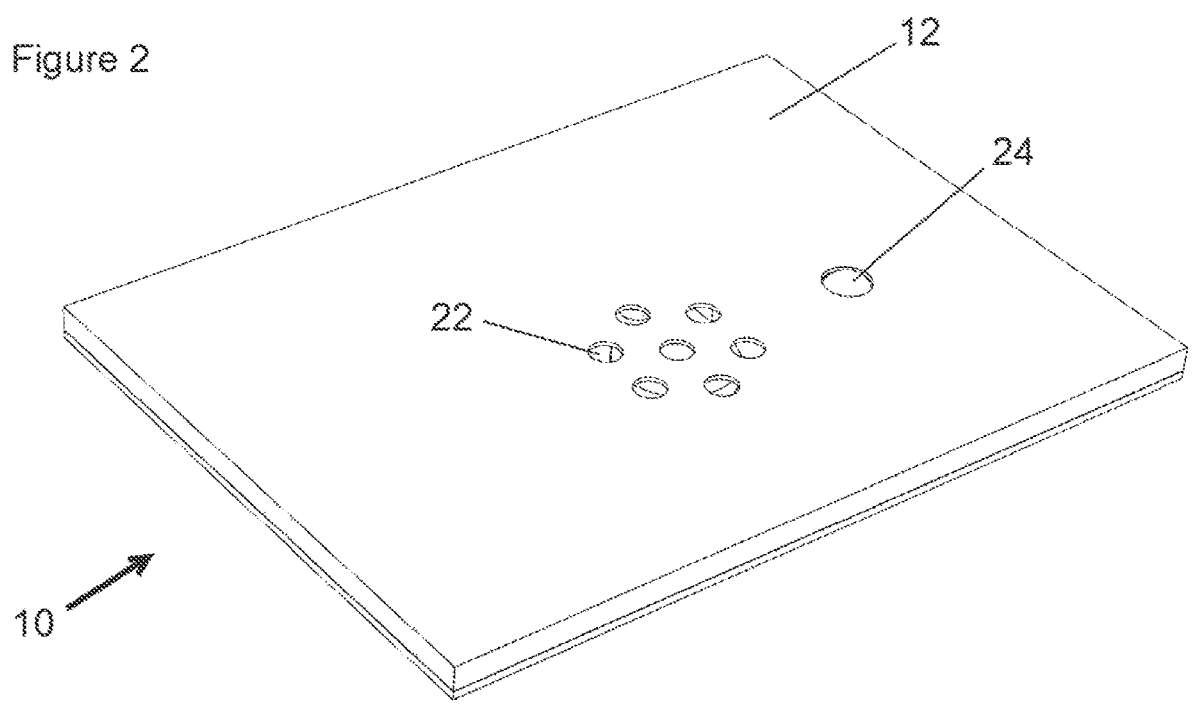
FIG. 2 is a perspective front view of a covered beacon of FIG. 1, showing openings for the sound generator and the LED, according to the present invention.

The Beacon:

Referring now to FIG. 1, an active transceiver beacon 10, according to a first embodiment of the invention is shown, including a housing 12 (shown without a cover plate to reveal the internal components), a microprocessor 14, a Bluetooth® radio transceiver circuit 16, a battery 18, an antenna 20, a local sound generator device 22, such as a buzzer, vibrator motor, or speaker, an LED 24, and a motion sensor and accelerometer 26. As is well known in the art, such beacon modules are often sealed in a small thin plastic housing 12, such as the one shown (with a cover plate) in FIG. 2. There are several different manufacturers of Bluetooth Low Energy beacons (BLE beacons) commercially available. A preferred version is called "iBeTag," model number: AKMW-iB003N-PA, manufactured by Shenzhen AnkhMaway Electronic Technology Co., Ltd of Shenzhen, China which uses an nRF51822 chipset. The nRF51822 is a powerful multiprotocol single chip solution for ULP wireless applications.

It incorporates Nordic's latest best-in-class performance radio transceiver, an ARM Cortex™ M0 CPU and 256 kB/128 kB flash and 32 kB/16 kB RAM memory. The nRF51822 supports Bluetooth low energy (formerly known as Bluetooth Smart) and 2.4 GHz protocol stacks. Although this preferred beacon module uses a chipset that includes microprocessor 14 and radio transceiver circuit 16 within a single IC chip, for clarity and completeness, these two components are shown as separate components in the Figures.

Another beacon that is suitable for use with the present invention is the Estimote Location and Telemetry beacon, made by Estimote, Inc. of NYC, N.Y. This beacon includes a General Purpose Input/Output (GPIO) interface, which is used to connect microcontrollers to other electronic devices, including sensors, LEDs, displays, and System-on-Chip modules. Beacons that include GPIO allows for providing external power supply, remote control of connected devices, broadcasting more contextual data, or defining contents for custom Bluetooth data packets.

GPIO can be used in three modes, Input, Output, and UART interface. In the GPIO Input mode, the beacon receives input from a connected device via the GPIO interface. In this manner, the output status (on/off) of a connected device can be broadcasted through the beacon. In this configuration, the beacon will broadcast the received data in the Estimote Telemetry data packet, the beacon will be "advertising" two 0/1 values.

In the GPIO output mode, the beacon delivers data to the connected device via the GPIO interface. In this arrangement, LED 24 can be turned on or off with the beacon controlled from a mobile app. In this configuration, the beacon will deliver data from two pins about their binary states to the connected device.

In the UART mode, the GPIO can be configured as an UART interface allowing the advertisement packets to be customized for the Beacon.

Other commercially available beacon manufacturers include Blue Cats, Inc. of Sydney NSW, Australia, Estimote, Inc. of NYC, N.Y., Gimbal of Los Angeles, Calif., Radius Networks, Inc. of Washington, D.C., Kontakt, of Krakow, Poland, and Accent Systems of Barcelona, Spain. The present invention may use any beacon, as long as it includes (or is capable of including) a motion sensor, or an accelerometer, an LED and is capable of sending sensor data and receiving commands to operate the LED. A BLE type Beacon is preferred since it operates at low power and therefore can operate longer before having to replace the internal battery 18.

The Battery:

Battery 18 provides operating power to all components described above located within beacon 10 and shown in FIG. 1. Battery 18 may be any suitable size, as long as it supplies the correct voltage for the electrical components to operate normally. The preferred beacon module, identified above, uses a 3Vdc CR2477 button cell battery. Battery life in a beacon generally depends on how often its radio transmitter transmits and the power of the transmission. The higher the transmission rate and the greater the broadcast range, the more power the beacon will consume and the quicker the battery will dissipate.

Transmitting Data:

As is well known by those skilled in the art, BLE communication consists primarily of "Advertisements", or small packets of data, broadcast at regular intervals by Beacons or other BLE enabled devices via radio waves. BLE Advertising is a one-way communication method. Beacons that want to be "discovered" can broadcast, or "advertise" self-contained packets of data in set intervals, usually between 10 times per second and once every minute. These packets are meant to be received by devices, such as smartphones, where they can be used for a variety of smartphone applications, including the triggering of push messages, app actions, and prompts. There are a few recognized packet protocols or standards used with beacons, including iBeacon, AltBeacon and Eddystone. Beacon 10 preferably uses the Eddystone format, but any appropriate standard may be used.

Regardless of the type of beacon module or the transmitting standard used, Beacon 10, according to the present invention, is designed to send out packets of data at set intervals, continuously, at a preferred rate of about once every second. Ideally, beacon 10 would enter into a sleep mode wherein few if any broadcasts are made, until the beacon is needed, according to the present invention.

As explained in greater detail below, beacon 10 preferably uses only the "advertisement" packet to transmit data from the beacon to the phone. This allows one-way communication and is very effective because the phone and beacon don't have to maintain a connection. However, in order for the phone to activate LED 24 or buzzer 22 on beacon 10, a two-way connection must be established and maintained. Generally, the format for BLE Advertising includes a data packet that consists of four main pieces of information, a UUID, a "Major," a "Minor," and a "Tx Power." The UUID is a 16 byte string used to differentiate a large group of related beacons. The "Major" is the next level down and includes a 2 byte string used to distinguish a smaller subset of beacons within the larger UUID group. Continuing, the "Minor" is a 2 byte string meant to identify individual beacons. Finally, the Tx Power data is used to determine proximity (distance) from the beacon. As described below, the present beacon will utilize data packets which include the UUID, the Major and the Minor data so that each individual beacon can be identified.

Figure 3:
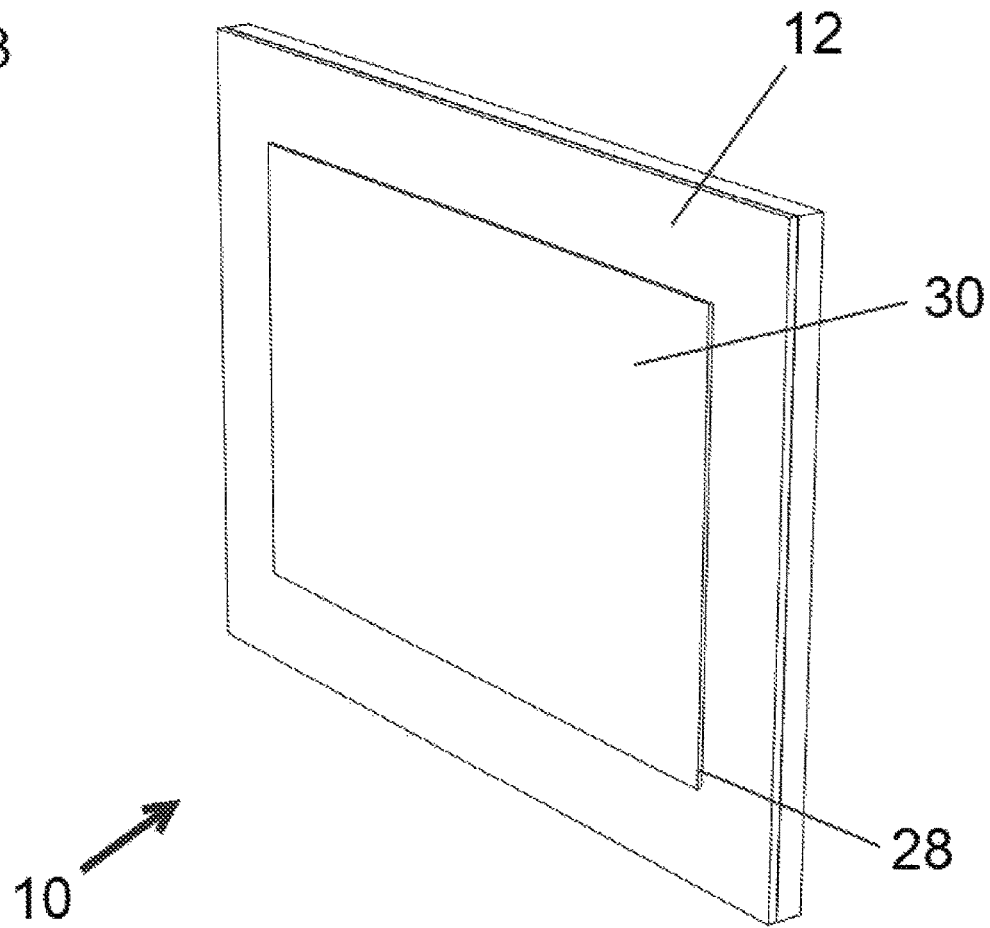
FIG. 3 is a perspective rear view of the covered beacon of FIG. 2, showing a self-adhesive backing layer, according to the present invention.
Figure 4:
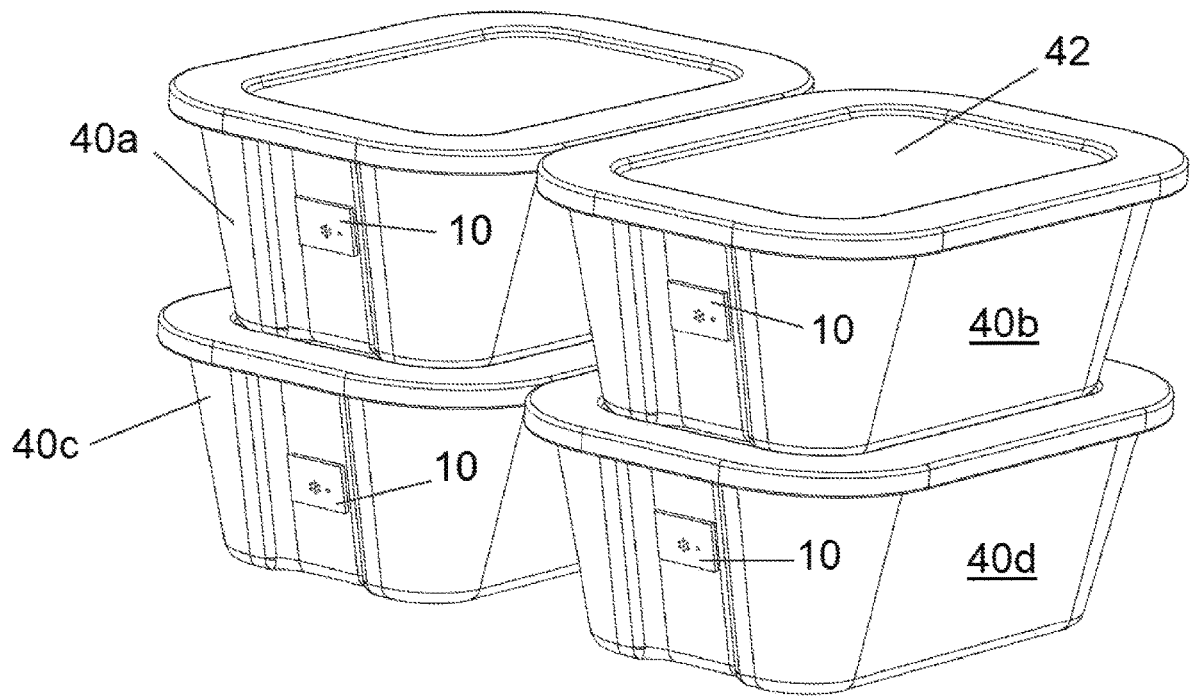
FIG. 4 is a perspective view of four exemplary storage containers, each of which including a beacon, of which none of the beacons shown are activated, according to the present invention.

Referring to FIG. 3, a rear surface beacon 10 is shown including a self-adhesive backing layer 28 (which includes a release layer 30). In use, and as shown in FIG. 4, a beacon 10 is secured to a front side surface of a storage container 40a-d by peeling off the release layer 30, and pressing the now exposed self-adhesive layer 28 against the side surface of each container 40a-d. It is preferred that beacon 10 is secured to an area of container 40a-d so that it is accessible and in view, particularly during a walk-through search, as discussed below. Although beacon 10 is shown and described adhered to the outside of containers 40a-d, Applicants contemplate providing a container 40a-d, or a container lid that includes beacon 10, integrally formed therein.

Containers 40a-d may be any suitable type of container, such as cardboard boxes and plastic storage bins, which usually include a lid 42. Prior to storing items, in accordance with the present invention, the user would have secured at least one beacon 10 to at least one container 40a-d, but, as shown in FIGS. 4-8, each of four containers 40a-d have a beacon 10 attached thereto. Once beacons 10 are attached and operating, they each will transmit their advertisement packets of data to the surrounding area. As mentioned above, each data packet will include a numerical ID for each specific beacon, as well as other information relating to sensor data, in particular, the onboard motion sensor and accelerometer 26.

Figure 5:
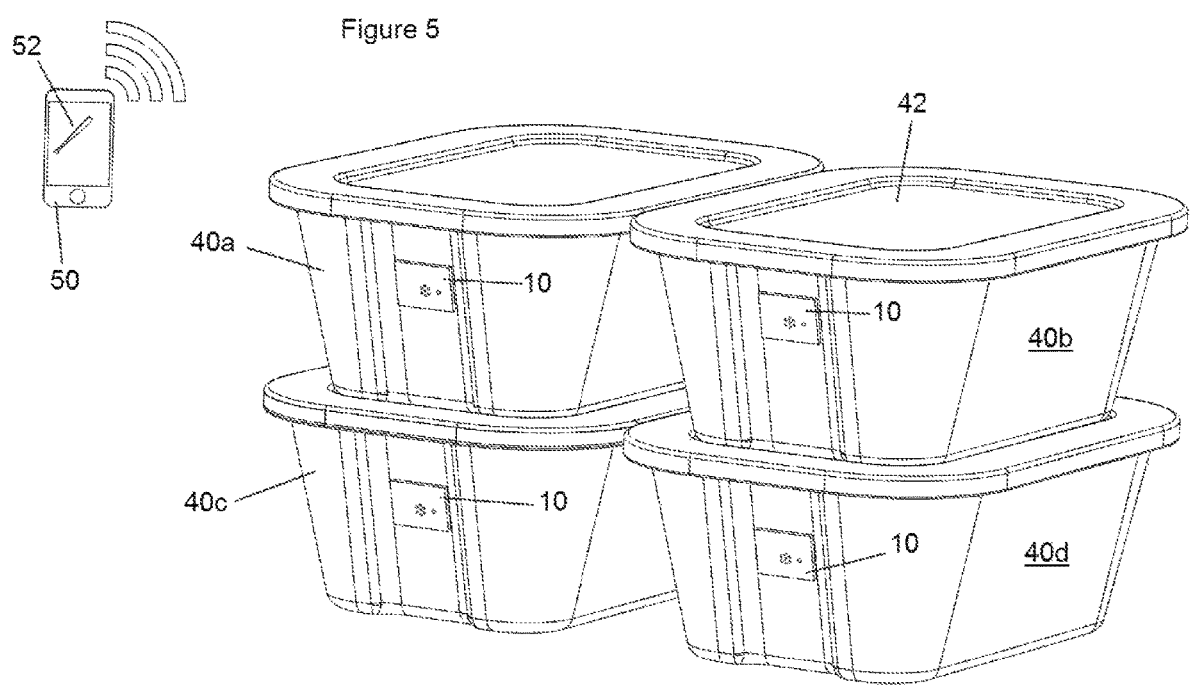
FIG. 5 is a perspective view of the four storage containers of FIG. 4, and showing a smart device broadcasting a search request to the beacons on the containers, with no beacons yet activated, according to the present invention.

Software Application:

The present storage management system includes a software application (a mobile app) that operates on a user's smart device 50, which is shown in FIG. 5. The software application includes a "Store-It" mode, which the user would use to associate items to be stored with specific beacon 10, and container 40a-d, and a "Find-It" mode, which, as the name suggests, the user would use to find specific items already stored. These two modes are described below.

Store-It Mode:

According to the invention and referring to FIG. 5, when a user wishes to store items in containers, such as containers 40a-d, he or she first opens up the subject software application using his or her smart device 50, which may be a smartphone, a smartwatch, or a smart tablet. Once the application is open and running, smart device 50 will immediately receive all broadcast transmissions by the four beacons 10 of the four containers 40a-d. The user will first select the "Store-It" mode. The application will then instruct the user to firmly tap or move the container 40b, the one he or she wishes to store items. Onboard motion sensor and accelerometer 26 located on beacon 10 will sense the movement to container 40b and will add data to the next outgoing broadcast, conveying that motion sensor and accelerometer 26 just detected movement. When smart device 50 receives the advertisement packet, including the ID number of the beacon 10 located on container 40b together with the added sensor data which indicates that motion sensor and accelerometer 26 just detected movement, then the software application will be able to flag the ID number of that particular beacon 10 and create a memory folder linked to that ID number. At this point, the software application can identify which container the user just tapped and therefore which container the user is about to load with an item. To confirm that the software application has identified the correct beacon, a two-way communication link to that specific beacon can be made, as is well known by those skilled in the art, allowing the software application to use the Bluetooth radio transceiver of the smart device to transmit instructions to beacon 10 of container 40b to illuminate onboard LED 24 and/or buzzer 22 to generate sound for a predetermined period of time. The user can see the illumination for confirmation that the correct beacon has been identified.

Instead of using motion sensor and accelerometer 26 to sense movement of a container, a less preferred method of providing a scannable barcode, such as a QR code can be provided on each beacon 10 which conveys the ID number of each particular beacon. In this arrangement, the user can use the camera feature of smart device 50 to scan the barcode, when instructed to do so by the software application. The application can then translate the scanned code into an ID code.

The software application will now automatically launch the camera feature of smart device 50 and will also instruct the user to photograph the item that he or she wishes to place inside container 40b. After the user takes a picture of the item 52, which is for example, a toy bat, as shown in FIG. 5, the software application will store the digital photograph of item 52 in the memory folder of the beacon ID number linked to container 40b. The application will then ask the user to input a quick description of the item to help catalog it for later searching. Adding text description information is not required and the entire input effort can be limited to the user simply taking a picture of the item. According to another feature of the present invention, the software application may utilize well known photo-recognition software to automatically identify the item by analyzing the photograph. The application can then provide suggested single word descriptions of the item, such as "bat" or "lamp." The user can then select the suggested description, if appropriate.

The user then places the item inside container 40b and the application automatically instructs the user to take a photograph of the next item, if there is one. If not, the user can close the application.

All folders previously created representing other containers 40a, c-d, will appear on the user's phone screen as graphic storage containers (with their names appearing, if they were named). The newly identified and currently open container would appear as an open-container graphic to indicate that that container 40b is currently receiving items for storage.

As the user catalogues additional items into various containers 40a-d, using the software application, he or she can create different categories of items within the application, even if the items reside in different storage containers. For example, the user may store camping gear in different containers 40a-d. According to the invention, the software application will keep track of each item in each container 40a-d, and will help the user locate all items in the camping category when needed, as described in the "Find-It" section below.

According to the present invention, the software application will include features to allow the user to drag and drop on-screen graphic containers into any of a pre-populated list of common storage areas, such as garage, basement, attic, hall closet, master bedroom closet, under masterbed, etc. With this arrangement, the user will be able to quickly and easily organize the storage containers and also provide another level of searchability, such as: "show me all camping items in the attic only."

Additionally, the present software application will allow the user to touch any listed container graphic displayed on the touch-screen of their smart device 50 to open that container and reveal the contents of that selected container. A scrollable list of each picture of each item (and any additional description) located in the memory folder associated with the selected container will appear on the screen. The user may touch any of the listed items and drag and drop the item to any other listed container graphics appearing on the screen. The user must remember to move any item in the real world so that the contents of the containers 40a-d in the real world match the images of the items stored in the memory folders of the smart device 50.

Alternatively, according to the present invention, during the "Store-It" mode, the present software application can activate the microphone of smart device 50 in such a manner that allows the application to continuously listen for audible input. Once the user speaks, by describing the item to be stored, for example "toy bat", the application will automatically activate the camera of the smart device, thereby capturing both the description and the photograph of the item to be stored quickly and with as little effort to the user as possible. The user only has to speak a single word to describe the item. For improved integrity and accuracy, the present application preferably only takes a picture if a spoken word from the user can be recognized.

As before, the picture data and now the audio data, which can be automatically translated to text, is stored in the memory folder linked to the "open" container 40a-d. Once a picture is taken, the application will automatically reset and again wait for a recognizable spoken word.

Although not preferred, according to the present invention, the user does not have to take any picture of any item being stored, but instead can skip the photo step by pushing a "next" or "skip" button on the screen. This action will advance the user to the step of describing the item. As mentioned above, the user can either type in a word description of the item, such as "Toy Bat," or simply speak the words "Toy Bat" and the application will catalog the text description of the item in the memory folder linked to the "open" container 40a-d.

The user would continue the above process until all items have been cataloged into smart device 50 in the application's memory folders and are also physically stored in the selected containers 40a-d. The user would then close the physical container 40a-d by securing 42 thereon, and then close the graphic representation of the open container on the screen of smart device 50.

The user may register a new container following the above steps and then use the previously mentioned cataloging steps to store an another item, or may simply walk to any already registered container 40a-d in his or her garage and scan the QR code to allow the running application on the user's phone to identify the container that the user selected. The application would then display the contents of the selected container, which is stored in the container's folder open the lid on the user's phone screen. If there is room for more items, or it is where the items should be stored, the user may select "Add Item" to the selected container on the screen of the phone and continue with the above-outlined steps to add a new item into the container's "folder".

Find-It Mode:

Referring now to FIGS. 5, 6, and 7, when a user is searching for a particular item 52, such as a toy bat, the user will launch the present application, according to the present invention and select the "Find-It" mode. Once selected, the application will ask the user to type in a search term (or simply speak a descriptive term by voice into the phone's microphone). The application will immediately list on the screen of the user's smart device 50 "hits" that match the search term by picture (if available) and complete description of the item. Date and time of when each item was stored can also be displayed. The user can scroll through the "hits" list and select the exact item he or she was looking for. The user may also scroll through all stored items by picture and/or text descriptions, as well as review all items located in any of the containers, simply by pressing any container graphic on the screen, or by storage area. For example, the user can speak into the microphone: "Items stored in bedroom closet" to review only those items, or speak a previously setup category, such as "camping" to see only camping items.

After finding a particular single item, the user simple double taps the desired item on the screen of smart device 50. The present application would, as mentioned above would use the Bluetooth radio transceiver of smart device 50 to establish a two-way communication with the beacon 10 whose ID matches the ID of the folder in which the descriptive information for the desired items are stored and would include instructions for the select beacon 10 to illuminate LED 24 and/or buzzer 22, as shown in FIG. 6. The illumination and buzzer can continue for a predetermined period of time, or until motion sensor and accelerometer 26 of beacon 10 detects movement, which would likely indicate that the user has located the container.

If the user has selected more than one item and the items are located in different containers, the present application would either cause the beacons of each container to illuminate only (no sound would generate to prevent confusion) only if the select containers are grouped in a common storage area, such as the garage. If not, then the application would indicate to the user which item is being located first and the user would press "next" for each subsequent item.

To conserve battery power, the alerts (illumination and sound) will only last a few seconds. The user will use the alerts to advance on the identified container and if necessary, will push a "repeat alerts" button on smart device 50, causing the selected tag to repeat the alert notification.

Tap and Find Feature:

Referring to FIG. 8, and according to another feature of the present invention, a user can explore a particular storage area with their smart device on and the present application running. The user can simply tap on the top of any container 40a-d, as shown as an arrow 62 in FIG. 8 to cause an impact vibration 64, or tap directly on any beacon housing 12 to cause motion sensor and accelerometer 26 of the particular beacon 10 to detect the motion. Beacon 10 would immediately broadcast the sensed motion to smart device 50 and the present application. In response to receiving this information, the present application would immediately display all items that are linked to that particular beacon 10 and container 40b on the screen of the user's smart device 50. The items would remain on the screen until the user taps on another beacon 10, wherein the contents of the second tapped container would similarly be displayed. With this arrangement, the user can quickly and easily examine the contents of each container without opening them.

Applicants contemplate a system wherein different taps can be distinguished to cause different actions. For example, a user can tap once on a select beacon 10 to cause a first action by the present application, such as display the items in that tapped container and tap two times on a single beacon 10 to cause a different action by the present application, such as opening that container's folder and changing to the "Store-It" mode to prepare for adding an item, as described above. Beacon 10 may only be able to send data indicating that motion sensor and accelerometer 26 detected movement and not be able to indicate that two consecutive taps occurred. To overcome this possibility, Applications propose that the user simply tap at a longer interval, such as waiting 2 seconds between taps. This time delay between taps would allow time for the beacon to "clear" and reset the input line of motion sensor 26 so that two separate "movement" signals would be transmitted by the beacon 10 and received by smart device 50. This would allow for other "tapping gestures" to be employed to expand the range of utility of the present invention.

Removing an Item:

If the user wishes to remove an item from the open container, the software application provides a menu of choices that allow the user to select if the item being removed is to be returned, moved to another container, or discarded permanently. A comments section is preferably provided to allow the user to include any additional information relevant to the items departure. The date and time of each action will be recorded.

Although other types of wireless personal area network transceivers operating at any of a variety of frequencies may be used without departing from the gist of the present invention, it is preferred to use Bluetooth low energy, which is referred to as Bluetooth LE, BLE or Bluetooth Smart since this technology provides efficient interval communication with sufficient coverage requiring less power to operate.

Light-Sensing Feature:

According to this feature of the present invention, beacon 10 includes a photosensor (not shown) which can be any of many different types of components which can detect the intensity of ambient light, including photoresistors, photodiodes, and phototransistors, as is well known in the art. According to this embodiment, beacon 10 is secured to container 40*a-d* in such a manner that the photosensor can detect the intensity of light located within the container. One way of doing this is to have the user secure beacon 10 inside the container. The user would then have to rely on activation of sound generator 22 to locate a container, instead of using the light from LED 24. Another method would be to have the light sensor mounted to beacon 10 so that it faces the rear of housing 12. A hole (not show) would be provided in housing 12, self-adhesive layer 28 and side wall of container 40*a-d* so that light located within container 40*a-d* can be measured by the photosensor of beacon 10.

According to this embodiment, the photosensor can measure the light within the container so that if a user opens a container, the light intensity would increase inside the container and the photosensor would detect it. The present application would immediately learn that lid 42 has been removed when beacon 10 transmits its advertisement data.

Through the use of the photosensor, removing lid 42 causes the application to display an open container graphic for that container 42*a-d*, and automatically displays the current contents within that container. When the user returns lid 42 back to container 40*a-d*, the light levels again fall within that container, and the attenuation of illumination is detected by the photosensor causing beacon 10 to transmit this information to smart device 50 and the present application. In response, the application can close the graphic container displayed on the screen. Other actions can be taken in response to changes of measured light within any particular container.

What is claimed is:

1. A wireless storage management system for storing at least one item, said system comprising:
    a container defining a cavity for storing said at least one item and an open end for providing access to said cavity, said open end having a rim;
    a source beacon attached to said container, said beacon having a microprocessor, a battery, a memory, two way wireless communication, an indicator, and a motion sensor, said source beacon being configured to transmit a signal at prescribed intervals, said signal including an ID code that is unique to said beacon; and
    said microprocessor adapted to add motion data to said transmitted signal in response to said motion sensor sensing motion of said container.

2. The wireless storage management system of claim 1, further comprising a lid which is sized and shaped to snuggly fit onto said container about said rim.

3. The wireless storage management system of claim 2, wherein said beacon is attached to said lid.

4. The wireless storage management system of claim 1, wherein said beacon is formed integrally within said container.

5. The wireless storage management system of claim 2, wherein said beacon is formed integrally within said lid.

6. The wireless storage management system of claim 1, further comprising a portable smart device having a microprocessor, a battery, a memory, a two way wireless communication, a microphone, a camera and a display, said two-way wireless communication being configured to receive said transmitted signals from said beacon, receive and store said unique ID code associated with said source beacon and read and interpret said motion data in said transmitted signal, if present.

7. The wireless storage management system of claim 6, further comprising a software application running on said portable smart device, said application configured to receive and store a description of said at least one item, said stored description data file being associated to said container by said stored ID code of said beacon.

8. The wireless storage management system of claim 7, wherein said software application provides a graphic indication of said container on said display and further provides access to said stored description of at least one item stored in said container.

9. The wireless storage management system of claim 8, wherein said description includes a digital image.

10. The wireless storage management system of claim 8, wherein said description includes audio data.

11. The wireless storage management system of claim 8, wherein said description includes text data.

12. A method for a smart device to identify a storage container selected by a user, wherein said container is meant to store items and includes a beacon having a microprocessor, a battery, a memory, two way wireless communication, an indicator, and a motion sensor, said source beacon being configured to transmit a signal at prescribed intervals, said signal including an ID code that is unique to said beacon and said container, said smart device having a microprocessor, a battery, a memory, a two way wireless communication, a microphone, a camera and a display, said two-way wireless communication being configured to receive said transmitted signals from said beacon, said smart device running a software application, said method comprising the steps of:
    moving, by said user, said container so that said motion sensor detects motion of said container;
    adding, by said microprocessor of said beacon of said moved container, motion data to said transmitted signal, in response to said motion sensor detecting said motion;

receiving, by said smart device, said transmitted signal, including said motion data and said ID code associated with said container; and identifying, by said smart device, said selected container by reading said ID code of said transmitted signal having said motion data.

13. The method of claim 12, further comprising the steps of:

digitally storing, in said smart device, image data of said stored items located in said container;

associating said stored image data with said ID code of said container;

displaying, automatically, said stored image data associated with said ID code on said display of said smart device in response to receipt of said transmission including said motion data and said ID code.

14. The method of claim 12, further comprising the step of:

displaying a graphic representation of said identified container on said display of said smart device.

15. The method of claim 12, further comprising the steps of:

transmitting, by said smart device to said beacon having said ID code, instructions for said beacon to activate said indictor; and confirming on said smart device, by said user, that activation of said indicator matches said selected container.

16. The method of claim 15, wherein said indicator includes an illuminating LED.

17. The method of claim 15, wherein said indicator includes a generated sound.

18. The method of claim 15, wherein said indicator includes a vibration.

19. A method for automatically controlling a smart device to capture and store associated audio and image data, said smart device having a microprocessor, a battery, a memory, a microphone, a camera and a display, said method comprising the steps of:

receiving said audio data by said smart device;

storing said received audio data;

activating, automatically, said camera to take a picture and generate said image data, said activating step being in response to said first storing step;

storing said generated image data; and digitally linking said stored audio data with said stored image data.

20. The method of claim 19, wherein said audio data is a description of a first item to be stored and said image data is an image of said first item.

* * * * *